United States Patent [19]

Bauer et al.

[11] Patent Number: 4,876,593

[45] Date of Patent: Oct. 24, 1989

[54] TEMPORARY HOT CELL AND RELATED METHOD FOR HANDLING HIGH RADIATION LEVEL SOURCES

[75] Inventors: Frank I. Bauer, Perry; Robert S. Mavretish, New Stanton; Regis P. Shogan, Monroeville; James Sejvar, Murrysville, all of Pa.

[73] Assignee: Westinghouse Electric Corp., Pittsburgh, Pa.

[21] Appl. No.: 158,009

[22] Filed: Feb. 19, 1988

[51] Int. Cl.$^4$ .............................................. H04N 7/18

[52] U.S. Cl. ...................................... 358/100; 358/93; 250/515.1; 414/146

[58] Field of Search ................. 358/100, 245, 229, 93; 250/505.1, 500.1, 507.1, 515.1, 517.1; 414/146

[56] References Cited

U.S. PATENT DOCUMENTS 2,861,699 11/1958 Youmans ............................ 358/100
3,940,628 2/1976 Stock et al. ...................... 250/517.1
4,169,758 10/1979 Blackstone et al. ................ 358/100
4,526,311 7/1985 Schröder ............................ 358/100

*Primary Examiner*—John K. Peng

[57] ABSTRACT

A temporary hot cell and related method for handling high radiation level sources having wall, ceiling and floor structures comprised at least in part of temporary structures forming an enclosure to reduce to acceptable levels radiation of the surround from high level radiation sources handled within the enclosure. Preferably one or more manipulator arms extended through a wall structure of the enclosure to permit handling of the high level radiation sources within the enclosure by an operator located external to the enclosure. A window is positioned in the wall structure of the enclosure to allow an external operator to view handling of the radiation sources. The hot cell preferably also has a false floor, a filter and vent system sheeting to cover portions of the inner surface of the temporary structure forming the enclosure hot cell.

17 Claims, 6 Drawing Sheets

TEMPORARY HOT CELL AND RELATED METHOD FOR HANDLING HIGH RADIATION LEVEL SOURCES

FIELD OF THE INVENTION

This invention relates to hot cells for handling high radiation level sources, and, more specifically, to temporary and semi-permanent hot cells for handling of high radiation level sources at field locations.

BACKGROUND OF THE INVENTION

Hot cells for handling high radiation level sources remotely with manipulator arms are well-known. Generally, they have thick, poured concrete walls, ceilings and floors, as necessary, to attenuate the gamma radiation from the sources during handling within the cell. Manipulator arms are provided, together with a window and/or television camera and monitor, so that an operator can handle the high radiation level sources within the hot cell from exterior of the cell.

These hot cells generally have been permanent installations in the past. It may have been proposed to make a portable, self-contained lead hot cell, but this would not have been practical if proposed. It has been known to have a loading device as part of a shipping cask for gamma sources, but these loading devices have limited application to, for example, handling one or two sources. Additionally, it has been proposed to use concrete blocks notably in nuclear power plants to provide shielding to protect workers during performance of the repairs and the like, but these have not been used to provide a temporary hot cell integral with the building structure.

The need for a temporary or semi-temporary hot cell for transfer of high radiation level sources at field locations, such as hospitals, has become evident with the development of complex medical devices which require multiple high radiation level sources, e.g., the Leksell Gamma Knife Unit, using over 200 Cobalt 60 sources of 30 curies each. Heretofore, it was necessary to transport the medical device to a permanent hot cell where the high radiation level sources would be loaded into and unloaded from the device. Although it may be necessary only to replace the radiation sources every five to ten years, this still presented a very difficult problem because of the increased costs and also because of laws and regulations limiting or prohibiting transporting such devices containing high radiation sources.

SUMMARY OF THE INVENTION

A temporary hot cell for handling high level radiation sources of the present invention has wall, ceiling and floor structures comprised at least a part of temporary structures forming an enclosure to reduce to acceptable levels radiation of the surround from high level radiation sources handled within the enclosure. The temporary structures are preferably formed of solid concrete or lead blocks capable of absorbing high levels of gamma radiation. At least one manipulator arm, and preferably two or more redundant manipulator arms, extend through a wall structure of the enclosure to permit handling of high level radiation sources within the enclosure by an operator located external to the enclosure. The manipulator arms are removable from the enclosure through the wall structure by providing an appropriate support within the wall structure and appropriate space within the enclosure and in the surround adjacent to the wall structure through which the manipulator arms are extended. Preferably, a window is positioned in a wall structure of the enclosure to allow an operator external of the enclosure operating the manipulator arms to view handling of high level radiation sources within the enclosure. The window also reduces to acceptable levels the radiation of the surround by high level radiation sources within the enclosure. Alternatively, or in addition to the window, a television camera is provided within the enclosure and a television monitor provided external of the enclosure to allow the operator external of the enclosure to view handling of the high level radiation sources by the manipulator arms within the enclosure.

The temporary hot cell of the present invention also preferably has a false floor in the enclosure, as necessary, to permit any high level radiation sources that are dropped within the enclosure from being out of reach of the manipulator arms. The false floor is sloped so that any dropped source moves under the force of gravity to a position where it can be reached by one or more of the manipulator arms. Also, the hot cell of the present invention preferably has at least one access port in a wall structure of the enclosure to allow transport of tools and materials between the interior and exterior of the enclosure.

In addition, the temporary hot cell for handling high level radiation sources preferably has sheeting that covers at least portions of the interior surfaces of the walls, ceiling and floor structures of the enclosure. This sheeting avoids radiation contamination of the temporary structure forming the enclosure by any radioactive particles within the enclosure. The sheeting also preferably inhibits the concrete blocks, or other materials forming the temporary structures, from falling into the enclosure and damaging equipment and reducing the radiation attenuation capability of the temporary structures, and, in addition, to provide light reflection within the enclosure to improve the vision of the operator in handling radiation sources with manipulator arms within the enclosure.

The temporary hot cell for handling high level radiation sources also preferably has a first hoist means to permit opening and closing of a transfer cask and other radiation equipment as needed, that are positioned within the enclosure. The hoist means may be within the enclosure, but is preferably exterior of the enclosure and attached through reeving to lid structures within the enclosure to avoid radiation contamination should an accident or other unusual event occur. In this connection, an emergency port is also preferably provided in the structure of the enclosure, preferably the ceiling structure, to allow for alternative hoist means external of the enclosure to close the transfer cask and other radiation device in the enclosure in the event of malfunction of the first hoist means.

The temporary hot cell of the present invention also preferably has a filter and vent system through the structure forming the enclosure to allow venting of air from the enclosure. The venting is through the filter to avoid radiation contamination of the surround by the air from within the enclosure should a radiation leak occur within the enclosure. The vent system preferably forces air, by fan or other similar means, from the enclosure to the surround through the filter. The negative pressure thereby created within the enclosure causes air from the surround to flow into the enclosure through available leakages (e.g., around the manipulator arms), thereby inhibiting contamination of the surround by air from within the enclosure escaping through such leakages should a radiation leak occur. The main purpose of the vent, under normal operation, however, is to keep the enclosure from becoming too hot by heating from lighting and other sources.

The temporary hot cell described above also provides a method for handling high level radiation sources.

Other details, objects and advantages of the invention will become apparent as the following description of the presently preferred embodiments and presently preferred methods of practicing the same proceeds.

DESCRIPTION OF THE DRAWINGS

In the accompanying drawings, the presently preferred embodiments of the invention and presently preferred methods of practicing the invention are illustrated, in which.

DESCRIPTION OF THE PREFERRED EMBODIMENTS

Figure 1:
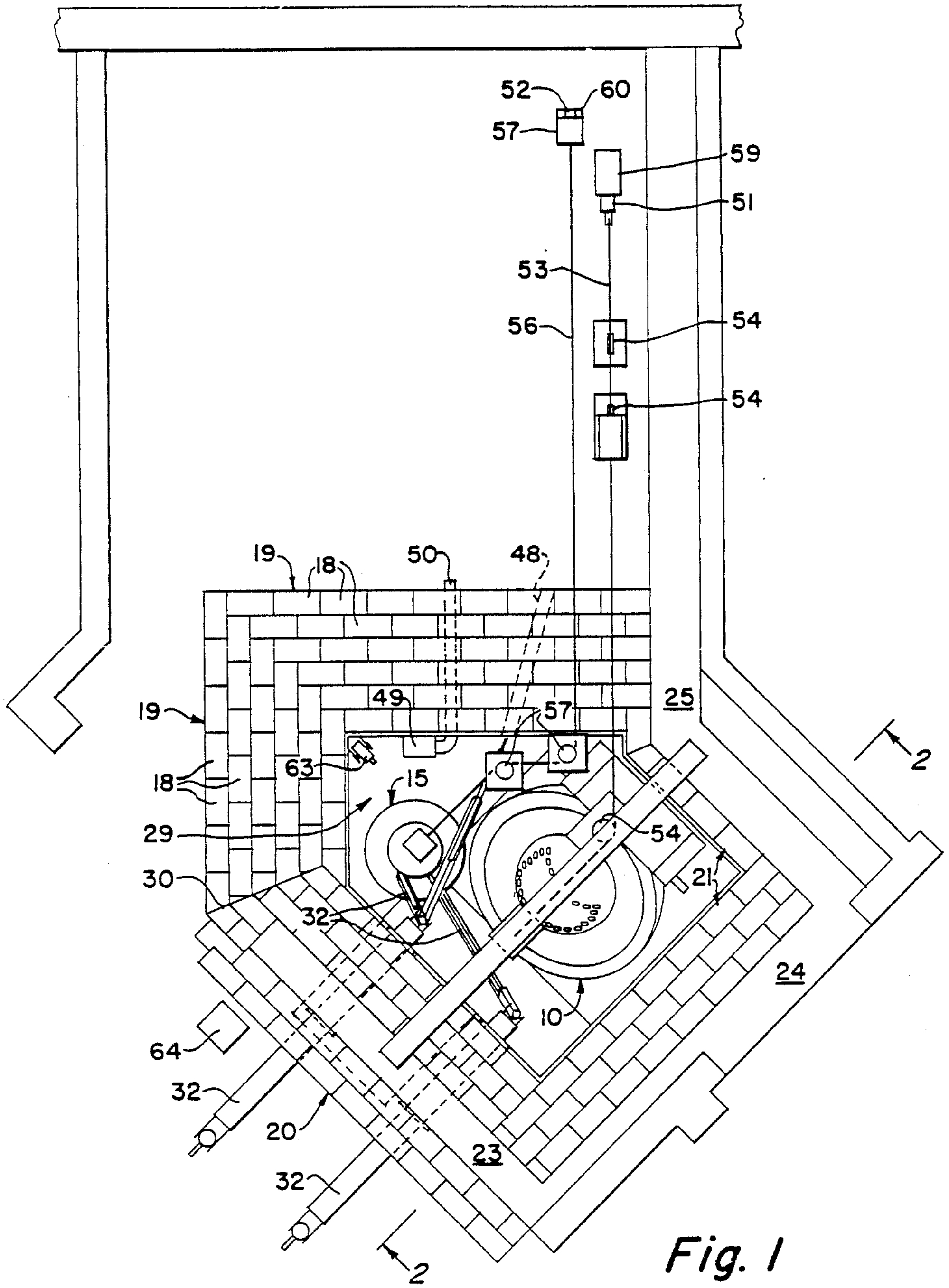
FIG. 1 is a plan view of a hot cell for handling high level radiation sources of the present invention.

Referring to the drawings, the present invention is illustrated with reference to handling of high level radiation sources in transfer from a shipping cask to a Leksell gamma unit in a hospital. The Leksell gamma unit is used for treatment of brain tumors by radiation. The Leksell gamma unit requires the transfer of over 200 Cobalt 60 sources of 30 curies each. The radiation dose to be delivered in one treatment session, for example, by the Leksell gamma unit is 6,000 rads in twenty minutes. The present invention has similar preferred applications in connection with other medical devices and other radiation devices requiring loading and replacement of multiple high level radiation sources. In addition to hospital sites, the invention has application at other field sites such as nuclear power plants.

In the drawings, a Leksell gamma unit 10 is shown having base shell 11 and hinged lid shell 12, which mate in a stepped arrangement, to provide a permanent radiation shield of the exterior from high level radiation sources housed within the gamma unit 10. Within Leksell gamma unit 10, enclosed by base shell 11 and lid shell 12, when closed, is a hemispherical dome 13 having multiple seats 14 in which individual high level radiation sources are positioned. Adjacent Leksell gamma unit 10 is positioned shipping cask 15 having shielded lid 16 and internal rack 17 attached to lid 16. Rack 17 has trays in which high level radiation sources are nested and stacked during shipping. In the present invention, shipping cask 15 containing the high level radiation sources to be handled is preferably first positioned adjacent Leksell gamma unit 10. If Leksell gamma unit 10 already contains spent high level radiation sources, it is preferable to also position a second, empty shipping cask (not shown) similar to cask 15 adjacent Leksell gamma unit 10.

The hot cell of the present invention is then provided by laying blocks 18, preferably solid concrete blocks, to provide temporary wall structures 19, 20 and 21 and temporary ceiling structure 22. These walls and ceiling structures are integral with and supplement existing permanent walls 23, 24 and 25 and permanent ceiling 26 containing support I-beam 27, so as to provide with floor structure 28 an enclosure 29 containing Leksell gamma unit 10 and shipping cask 15. Temporary wall structures, such as shown 19, may provide the entire enclosure 29; preferably, however, as shown in FIG. 1, temporary structures 19, 20, 21 and 22 are integral with the existing wall, ceiling and floor structures of the building. In addition, as shown in FIG. 1, the temporary wall structures may be on one side of the existing walls 24 and 25, as is 21, or may be a temporary wall structure on both sides of an existing wall 23, as is 20. Additionally, temporary ceiling structure 22 may be part of a permanent ceiling structure, as is 26, or provide the entire ceiling structure of enclosure 29 supported by a temporary steel or wood frame. In this connection, the shielding of the ceiling structure may be supplemented by the shielding of lid shell 12 when open. Alternatively, as shown for floor structure 28, one or more of the walls, ceiling or floor of enclosure 29 may have no temporary structure and may be an existing permanent part of the building, where the existing structure provides acceptable shielding of the surround from high radiation sources in enclosure 29.

Figure 2:
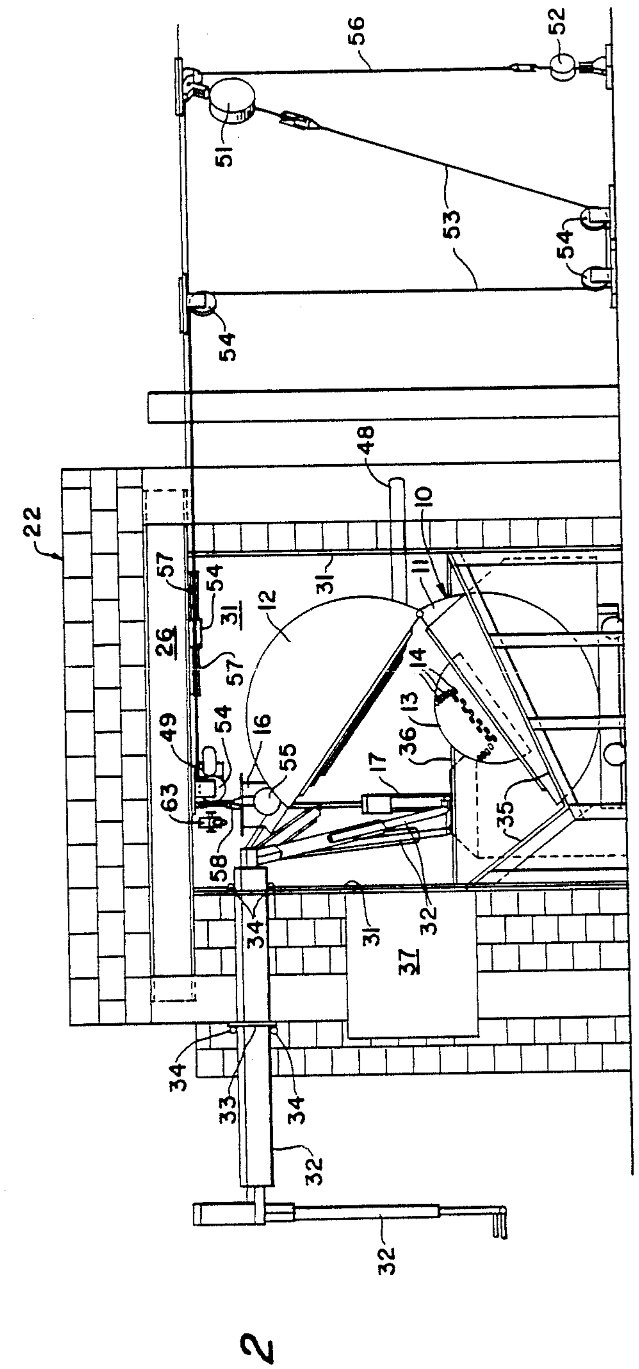
FIG. 2 is an elevational view of a hot cell for handling high level radiation sources oriented from line 2—2 of FIG. 1.

The important point is that the combination of the temporary structures and the permanent structures of the wall, ceiling and floor structures forming the enclosure 29 reduce to acceptable levels (e.g., 2-10 millirems per hour) radiation of the surround from high level radiation sources within enclosure 29 even under unusual circumstances such as fracture of a primary casing in which the radiation source is delivered in shipping cask 15. What is acceptable levels for the surround will depend upon the particular area thereof and may vary during operation of the hot cell. For example, as shown in FIG. 2, no supplemental temporary structure is needed for the floor structure since the gamma penetration is into a foundation of the hospital. On the other hand, a temporary structure may be needed to supplement the floor structure 28 if the hot cell is to be located in upper stories of the hospital structure. Similarly, acceptable levels and less shielding may be necessary at certain parts of the surround than at others because they are not inhabited during loading or operation of the hot cell.

Preferably, the temporary structures supplementing to provide the wall, ceiling and floor structures of enclosure 29 are standard, solid concrete blocks 18. Alternatively, they may be lead blocks or any other convenient material of adequate density to absorb large amounts of gamma rays emitted from the high level radiation sources within the hot cell, even under unusual conditions. In any case, blocks 18 are preferably laid, with minimum spacing between (e.g., less than 1/16 inch), in specific patterns as shown in FIGS. 1 and 2 to avoid radiation streaming. This is done by laying blocks 18 in staggered arrays as shown, both horizontally and vertically, where that is practical. In some instances, however, such as at seam 30, staggering is not practical and mortar may be necessary to avoid radiation streaming and provide acceptable levels of radiation in the surround. It should be noted in this connection that the use of mortar is preferably kept to a minimum so as to allow temporary structures 19, 20, 21 and 22, assembled by blocks 18, to be easily removed and reused.

Preferably, the internal surfaces of temporary wall structures 19, 20 and 21 are covered almost entirely by sheeting 31. Sheeting 31 is typically plywood of quarter-inch or half-inch thickness, or standard metal sheeting as may be available, e.g., 20 gauge, low carbon steel. Sheeting 31 avoids radiation contamination of temporary wall structures 19, 20 and 21 should a radiation leak occur, and inhibits blocks 18 of temporary structures 19, 20 and 21 from falling into enclosure 29 damaging equipment and reducing the radiation absorption of the wall structures. In addition, the internal surface of sheeting 31 is of a light color or painted a light color, to provide light reflectance and facilitate observation within enclosure 29 by an operator in remote handling of the radiation sources.

At least one and preferably at least two manipulator arms 32 extend through wall structure 20 to permit handling of high level radiation sources within enclosure 29 by an operator located external of enclosure 29. Manipulator arms 32 are standard components such as the Model-8 Master-Slave manipulators made by Sargent Industries, a subsidiary of Dover Corporation. Manipulator arms 32 are preferably mounted in wall structure 20 on square collars 33 and rollers 34 so that manipulator arms 32 can be readily removed from enclosure 29 through wall structure 20. To allow for removal of manipulator arms 32, suitable area in surround adjacent wall structure 20 should be allowed.

In this connection, it should be observed that the area within enclosure 29 is preferably kept to the minimum necessary to perform the handling of the high level radiation sources within the hot cell. However, the area of enclosure 29 needs to be sufficiently large so as to allow for use of manipulator arms 32 within enclosure 29 under various conditions, including when lid shell 12 of the Leksell gamma unit 10 and lid 16 of shipping cask 15 are opened, and to allow for removal of manipulator arms 32 from enclosure 29 through the wall structure 20. The area of enclosure 29 may also be larger than the minimum so as to allow better usage in shielding of the permanent wall, ceiling and floor structures of the building in which the temporary hot cell is located. The important point with regard to the area of enclosure 29 and the location of manipulator arms 32 in wall structure 20 is that manipulator arms 32 be able to reach all points appropriate for transfer of the radiation sources from cask 15 to the various seats 14 in hemispherical dome 13 in Leksell gamma unit 10. Preferably, manipulator arms 32 are so positioned to provide redundancy one for the other in the event of malfunction by each reaching both shipping cask 15 and all seats 14 in hemispherical dome 13 of Leksell gamma unit 10.

In this regard, false floor 35, made of plywood or other suitable material, is also provided in enclosure 29 to prevent high level radiation sources dropped within enclosure 29 from being out of reach of manipulator arms 32. As shown in FIG. 2, false floor 35 is built at angles so that any dropped source within enclosure 29 will move under the force of gravity to a point where it may be reached by at least one manipulator arm 32. In addition, as shown in FIG. 2, horizontal platforms 36 are provided in enclosure 29 to allow for storage of empty trays removed from interior 17 of cask 15 and of various tools used with manipulator arms 32 within enclosure 29 during operation of the hot cell.

Figure 3:
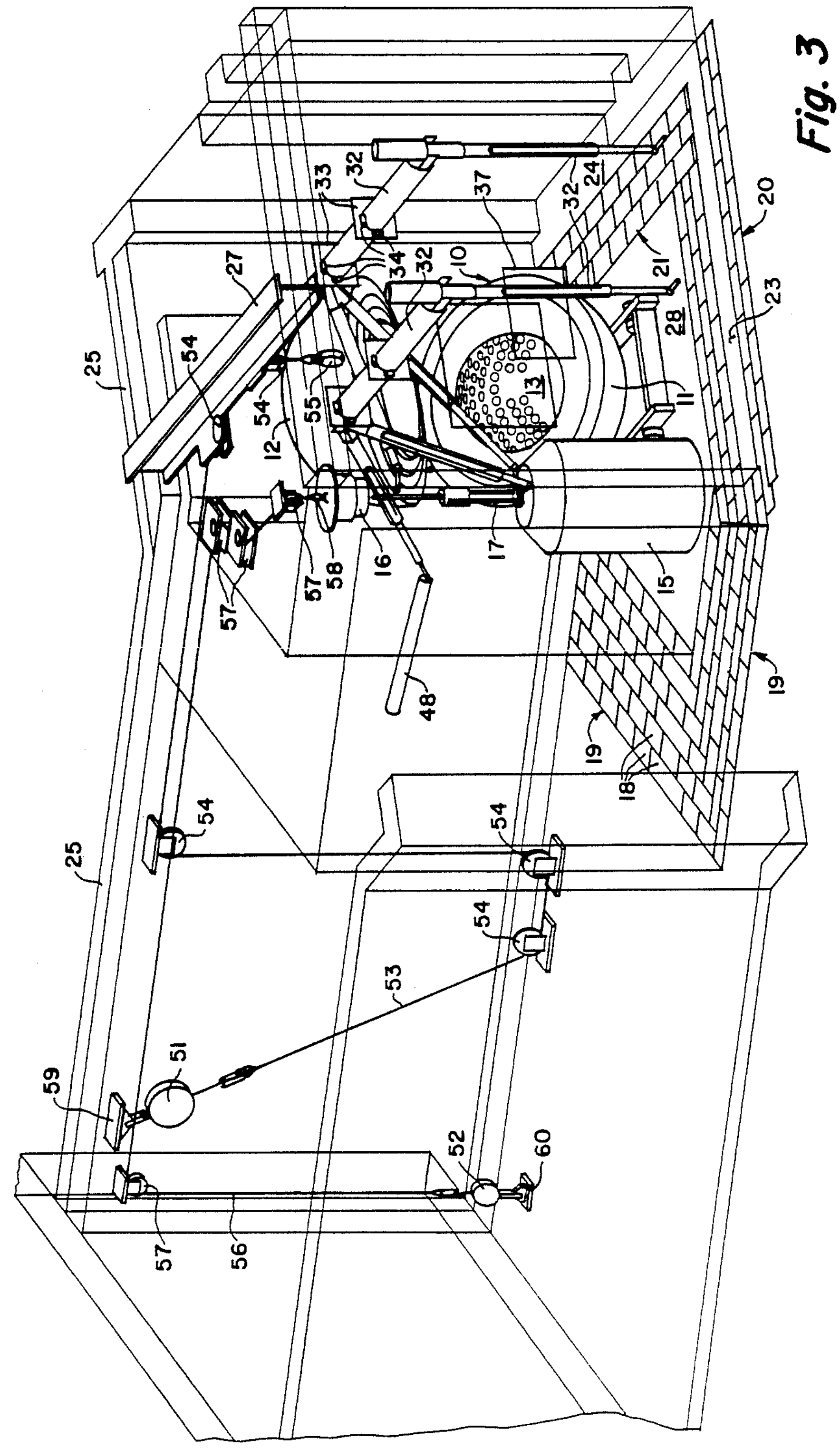
FIG. 3 is a perspective view of a hot cell for handling high level radiation sources with the walls of the enclosure shown in shadow line for clarity in illustration.
Figure 4:
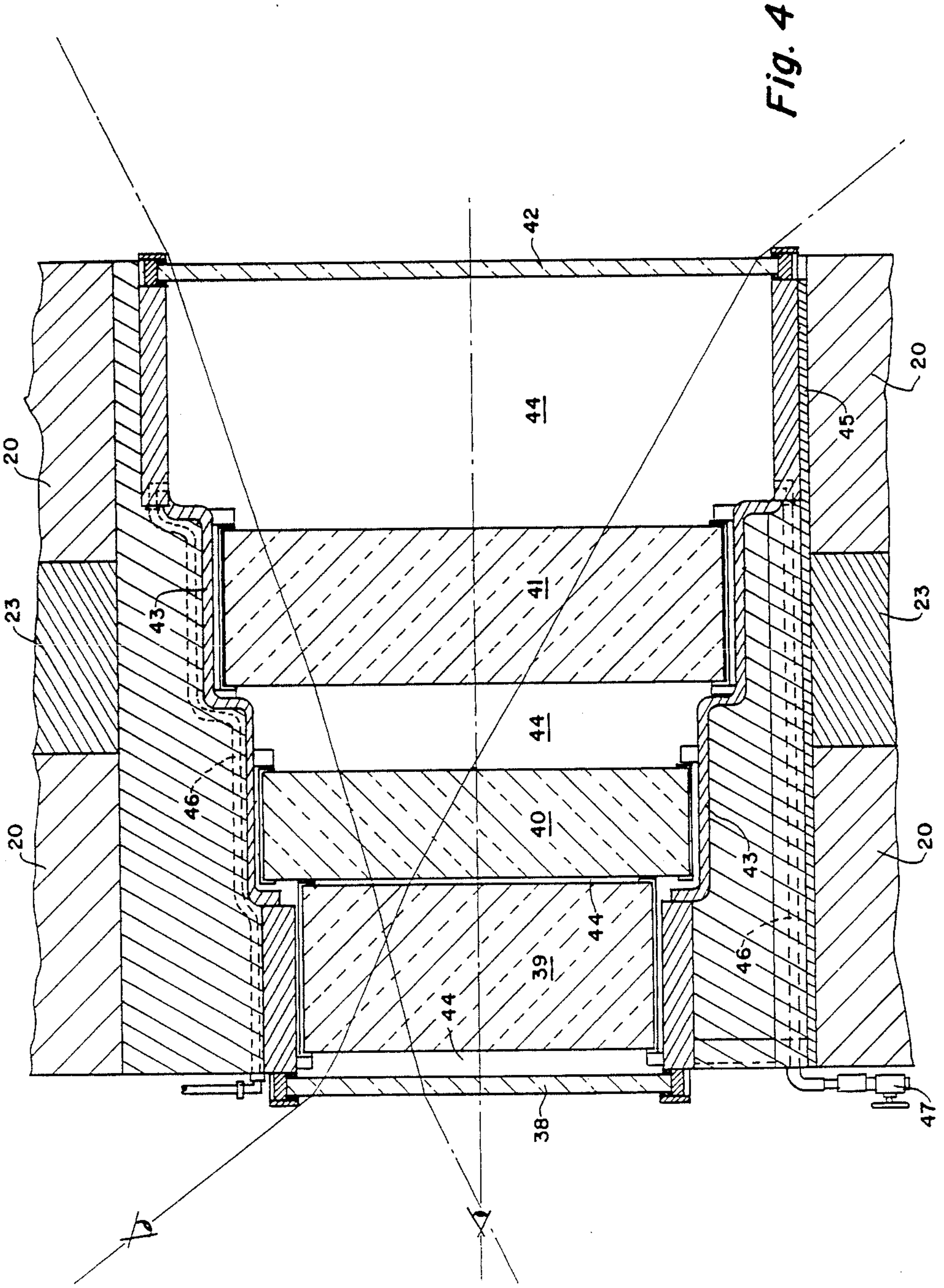
FIG. 4 is an elevational, cross-sectional view of a window for a hot cell for handling high level radiation sources of the present invention.
Figure 5:
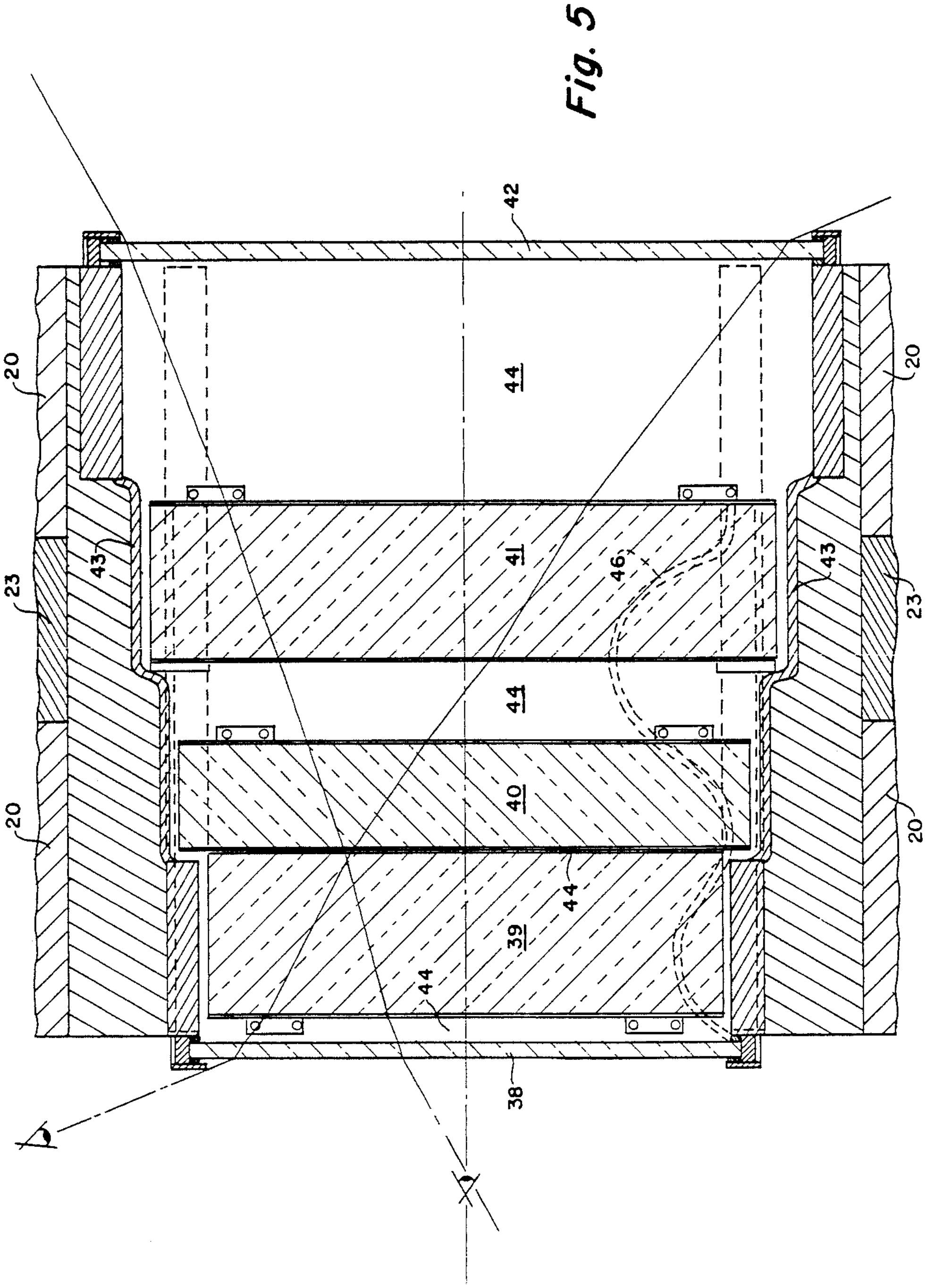
FIG. 5 is a plan, cross-sectional view of a window of a hot cell for handling high level radiation sources of the present invention.

Window 37 is also positioned through temporary wall 20 and existing wall 23 to allow an operator external of enclosure 29 operating manipulator arms 32 to view handling of high radiation sources within enclosure 29. Window 37 also reduces to acceptable levels radiation of the surround by high level radiation sources within enclosure 29 (e.g., 2 to 5 millirems per hour). This is accomplished preferably as shown in detail in FIGS. 4 and 5 by providing leaded glass 38, 39, 40, 41 and 42 spaced from each other in a tapered frame 43 designed to support the leaded glass and also oil 44 hereinafter described. Oil 44 is between leaded glass 38, 39, 40, 41 and 42 to reduce light loss through window 37 by reflectance of the light from surfaces of the glass 38, 39, 40, 41 and 42. The spacing between the glass 38, 39, 40, 41 and 42 containing oil 44 is of any suitable dimension so as to allow the window to extend substantially through wall structure 20, keeping in mind that oil 44 is less expensive than glass 38, 39, 40, 41 and 42. The density of glass 38, 39, 40, 41 and 42 (e.g., 6.2, 3.3, 2,7, 2.5) is preferably selected so as to absorb slightly more radiation than that absorbed by wall structure 20. Window 37 is tapered as indicated in FIG. 3 and shown in FIGS. 4 and 5 to reduce cost by reducing the amount of glass needed, and lead or other suitable material of suitable shielding density is provided around tapered frame 43 and becomes part of frame 43. Since the window 37 operates as a lens as indicated by the light inclinations illustrated on FIGS. 4 and 5, the operator external of enclosure 29 in operating manipulator arms 32 within enclosure 29 can see more than would be indicated by a straight line through window 37. Window 37 is also preferably nonbrowning glass so that it does not discolor with exposure to high level radiation. In addition, window 37 is mounted on skids 45 to allow for ease in positioning and removal of window 37 from wall structure 20. In this connection, it should be noted that a permanent frame (not shown) may be provided in existing wall 23 to support window 37, but this may not be needed in an installation where window 37 is through a temporary wall structure, such as 19. In addition, window 37 preferably has tubing 46 and drain 47 to allow for filling and draining of oil 44 from window 37 so that window 37 can be more easily positioned and removed from wall structure 20. In this connection, it should be observed that it may be necessary in some installations to provide a supplemental support (not shown), made of angle or channel members, or other suitable materials, to provide supplemental support for window 37 from floor structure 28.

The hot cell is also comprised of access port 48 through wall structure 19 to allow for transport of tools and materials between the interior and exterior of enclosure 29. Access port 48 can also be used to test the casings (also called "source bushings") of the sources for radiation leakages before transfer from cask 15 to Leksell gamma unit 10. Access port 48 can be positioned in any suitable location but is usually positioned as shown in FIG. 1 to allow direct access to shipping cask 15 and platform 36 adjacent shipping cask 15 (see FIG. 2) and is angled so that radiation streaming from enclosure 29 through access port 48 does not cause unacceptable levels of radiation exterior of the hot cell.

The hot cell also preferably has filter 49 in enclosure 29 and communicating with vent 50 extending through temporary wall structure 19, as shown in FIG. 1. Vent 50 allows air from enclosure 29 to be vented to the surround, but through filter 49 which collects any radiation contamination dust so that radiation contamination does not escape to the surround. Preferably, the venting system draws air out of enclosure 29, and air enters enclosure 29 around manipulator arms 32 and through other leakages by reason of the negative pressure developed in enclosure 29. Since air leakage typically occurs around the manipulator arms 32 with collars 33 and rollers 34, and through other leakages, vent 50 with filter 49 avoids leakage to the surround by any radiation contamination in the air within enclosure 29, and avoids the need to be concerned with sealing against air leakage from the enclosure.

The hot cell also preferably has hoist means 51 and 52 exterior of enclosure 29 for raising and lowering of lid shell 12 of Leksell gamma unit 10 and lid 16 together with internal 17 of shipping cask 15, respectively. Specifically, hoist means 51 is attached by cable 53 through pulleys 54 to lid shell 12 at 55, and hoist means 52 is attached by cable 56 through pulleys 57 to lid 16 of shipping cask 15 at 58. This reeving as shown best in FIG. 3, is deadened at 59 and 60, respectively, to allow hoist means 51 and 52 to lift lid shell 12 and lid 16, respectively. In this regard it should be observed that, with the Leksell gamma unit 10, the lid shell 12 is approximately eight tons and requires a hoist 51 able to lift approximately four tons. Hoist means 51 and 52 may alternatively be positioned in enclosure 29, although they are preferably exterior of enclosure 29 to avoid contamination by radiation leakage within enclosure 29.

Figure 6:
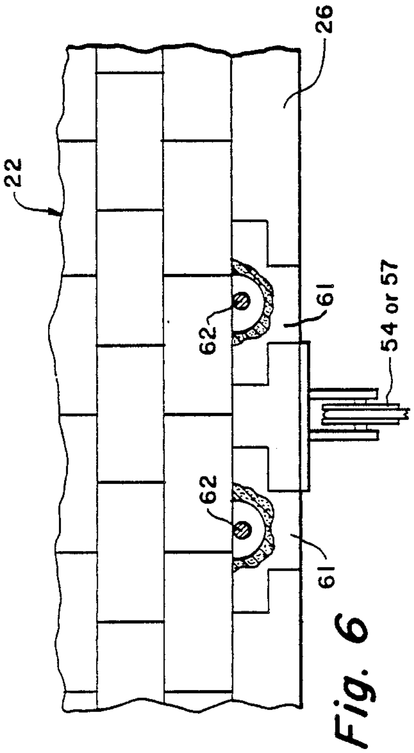
FIG. 6 is a fragmentary, cross-sectional view of an emergency access port for an alternative hoist means of a hot cell for handling high level radiation sources of the present invention.

The hot cell also preferably comprises emergency ports 61 as best shown in FIG. 6 to allow an alternative hoist means external of enclosure 29 to be attached to lid shell 12 of Leksell gamma unit 10 or lid 16 of shipping cask 15 in case of malfunction of hoist 52. As shown in FIG. 6, emergency ports 61 are stepped blocks positioned in existing ceiling 26, straddling pulley 54 or 57 immediately over Leksell unit 10 or cask 15. In case of malfunction, emergency ports 61 can be removed immediately above Leksell unit 10 or cask 15 by lifting at 62. A cable from an alternative hoist means (not shown) can then be lowered through the opening created by removal of emergency port 61 from existing ceiling structure 26, attaching the cable to lid shell 12 at 55 or lid 16 at 58 by use of manipulator arms 32, and detaching hoist means 51 or 52 from lid shell 12 at 55 or lid 16 at 58 by use of manipulator arms 32. Lid shell 12 or lid 16 can then be lowered by the alternative hoist means shielding the high radiation sources in Leksell unit 10 or shipping cask 15, and thereafter allowing for repair of hoist means 51 or 52. It should be observed that larger emergency ports 61 are provided over lid shell 12 of Leksell gamma unit 10 because the weight of lid shell 12 makes it necessary to provide a larger alternative hoist means at 55.

Figure 7:
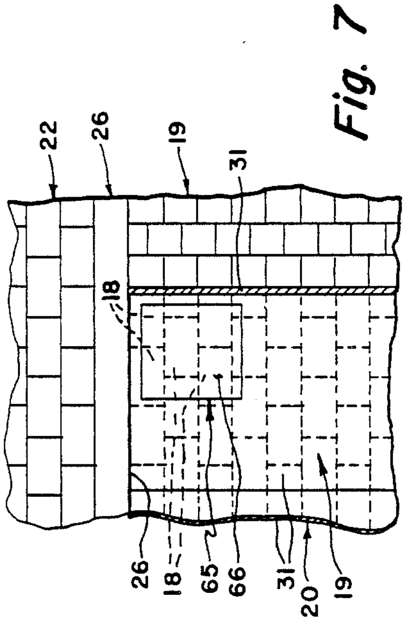
FIG. 7 is a fragmentary, elevational view illustrating an emergency access hatch of a hot cell for handling high level radiation sources of the present invention.

Alternative to window 37, but preferably supplemental to window 37, a television camera 63 is positioned in enclosure 29 and a television monitor 64 is positioned external of the hot cell to allow an operator external of enclosure 29 to operate manipulator arms 32 to view handling of high level radiation sources within enclosure 29. Additionally, or supplementally, mirrors may also be positioned in enclosure 29 to assist the Also, preferably, escape hatch 65 is provided in temporary wall 19 as best shown in FIG. 7. Escape hatch 65 preferably positioned near the upper part of wall structure 19, adjacent ceiling 26, by cutting portion 66 of sheeting 31 at the time wall structure 19 is assembled. Access hatch 65 is thus provided since access can be obtained simply by removing blocks 18 and portion 66 of sheeting 31. Access hatch 65 is particularly useful at the end of the handling of the high level radiation sources, prior to disassembly of the temporary hot cell, to allow checking of enclosure 29 for radiation before disassembly of the temporary structures of the wall, ceiling and floor structures forming enclosure 29. In this connection, it is useful to position a radiation counter within enclosure 29 during its assembly that allows for reading remotely by the operator from external of the hot cell.

While the presently preferred embodiments of the invention and methods for performing the same have been specifically described, it is distinctly understood that the invention may be otherwise embodied and used.

What is claimed is:

1. A temporary hot cell for handling high level radiation sources comprising:

wall, ceiling and floor structures comprised at least in part of temporary structures forming an enclosure to reduce to acceptable levels radiation of the surround from high level radiation sources handled within the enclosure;

at least one manipulator arm extending through a wall structure of the enclosure to permit handling of high level radiation sources within the enclosure by an operator located external to the enclosure, said manipulator arm being removable from the enclosure through the wall structure;

a window positioned in a wall structure of the enclosure to allow an operator external of the enclosure operating the manipulator arm to view handling of high level radiation sources within the enclosure, said window also reducing to acceptable levels radiation of the surround by high level radiation sources within the enclosure;

a false floor in the enclosure, as necessary, to prevent high level radiation sources dropped within the enclosure from being out of reach of the manipulator arm; and at least one access port in a wall structure of the enclosure to allow transport of tools and materials between the interior and exterior of the enclosure.

2. A temporary hot cell for handling high level radiation sources as claimed in claim 1 wherein:

the temporary structures of the enclosure are comprised of concrete blocks laid in specific patterns to avoid radiation streaming.

3. A temporary hot cell for handling high level radiation sources as claimed in claim 1 wherein:

the temporary structures of the enclosure are comprised of lead blocks laid in specific patterns to avoid radiation streaming.

4. A temporary hot cell for handling high level radiation sources as claimed in claim 2 wherein:

sheeting covers at least portions of the inner surfaces of the walls, ceiling and floor structures of the enclosure to avoid radiation contamination of the temporary structures forming the enclosure and to inhibit the concrete blocks of the temporary structures from falling into the enclosure.

5. A hot cell for handling high level radiation sources as claimed in claim 1 wherein:

at least two manipulator arms are positioned through a wall structure of the enclosure to provide redundancy with another manipulator arm in the event of malfunction.

6. A hot cell for handling high level radiation sources as claimed in claim 1 comprising in addition:

a first hoist means to permit opening and closing of a transfer cask and other radiation equipment as needed that are positioned in the enclosure and allow for transfer of high level radiation sources by the manipulator arms between the transfer cask and radiation device.

7. A temporary hot cell for handling high level radiation sources as claimed in claim 5 comprising in addition:

an emergency port in the structure of the enclosure to allow for alternative hoist means external of the enclosure to close radiation equipment in the enclosure in the event of malfunction of a first hoist means.

8. A hot cell for handling high level radiation sources as claimed in claim 1 comprising in addition:

a filter and vent system through the structure of the enclosure to allow venting of air from the enclosure through the filter.

9. A hot cell for handling high level radiation sources as claimed in claim 1 comprising in addition:

a television camera within the enclosure and a television monitor exterior of the enclosure for viewing by the operator of the operation of the manipulator arm within the enclosure in handling of high level radiation sources.

10. A method of handling high level radiation sources comprising the steps of:

A. supplementing existing wall, ceiling and floor structures with temporary structures to provide acceptable shielding of the surround from high level radiation sources to form a hot cell;

B. positioning at least one manipulator arm through a wall in the hot cell to permit remote handling of high level radiation sources within the hot cell by an operator from an exterior location; and C. viewing by an operator operating the manipulator arms to observe the operation of the manipulator arm in handling high level radiation sources within the hot cell.

11. A method of handling high level radiation sources as claimed in claim 10 comprising the additional steps of:

D. providing a first hoist means for opening and closing a transfer cask and radiation device positioned in the cell; and E. positioning an access port in a wall structure in the hot cell to allow transport of tools and materials between the interior and exterior of the hot cell.

12. A method of handling high level radiation sources as claimed in claim 11 comprising the additional step of:

F. providing an emergency port in the structure of the hot cell to utilize alternative hoist means in the event of malfunction of the first hoist means.

13. A method of handling high level radiation sources as claimed in claim 10 comprising the additional step of:

D'. locating a false floor in the hot cell preventing dropped high level radiation sources from by force of gravity being out of reach of a manipulator arm.

14. A method of handling high level radiation sources as claimed in claim 10 comprising the additional step of:

D". providing a filter and vent system through the structures of the hot cell to allow venting of air from the hot cell through a filter.

15. A method of handling high level radiation sources as claimed in claim 10 wherein step A includes:

an additional providing an interior sheeting over at least portions of the wall, ceiling and floor structure so as to avoid contamination by radiation of the temporary structure forming the hot cell.

16. A method of handling high level radiation sources as claimed in claim 10 wherein step C includes:

positioning a lead glass window in a wall structure of the hot cell.

17. A method of handling high level radiation sources as claimed in claim 11 wherein step D includes:

positioning a television camera within the hot cell and a television monitor exterior of the hot cell for viewing by the operator of operating of the manipulator arm within the hot cell in handling of high level radiation sources.

* * * * *